US011323364B2

(12) United States Patent
N et al.

(10) Patent No.: US 11,323,364 B2
(45) Date of Patent: May 3, 2022

(54) INGRESS REPLICATION PROCEDURES TO FACILITATE MIGRATION TO SEGMENT ROUTING TECHNOLOGY IN A COMPUTER NETWORK

(71) Applicant: Juniper Networks, Inc., Sunnyvale, CA (US)

(72) Inventors: Vinod Kumar N, Bangalore (IN); Robert W. Kebler, Newburyport, MA (US); Ashok Patrick Jude Manoharan, Pleasanton, CA (US); Hariharan Boopathy, Bangalore (IN)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 100 days.

(21) Appl. No.: 16/905,545

(22) Filed: Jun. 18, 2020

(65) Prior Publication Data
US 2021/0352010 A1  Nov. 11, 2021

(30) Foreign Application Priority Data

May 6, 2020  (IN) .............................. 202041019223

(51) Int. Cl.
*H04L 12/723* (2013.01)
*H04L 12/46* (2006.01)
(Continued)

(52) U.S. Cl.
CPC .......... *H04L 45/50* (2013.01); *H04L 12/4633* (2013.01); *H04L 45/04* (2013.01); *H04L 45/16* (2013.01)

(58) Field of Classification Search
CPC ..... H04L 45/50; H04L 12/4633; H04L 45/04; H04L 45/16
See application file for complete search history.

(56) References Cited

U.S. PATENT DOCUMENTS 10,892,981 B2 * 1/2021 Ceccarelli ............... H04L 45/34
2016/0021000 A1 * 1/2016 Previdi .................. H04L 45/507
370/392
(Continued)

FOREIGN PATENT DOCUMENTS

EP  3459214 A1  3/2019

OTHER PUBLICATIONS

Extended Search Report from counterpart European Application No. 20195568.9, dated Jan. 13, 2021, 9 pp.
(Continued)

*Primary Examiner* — Luat Phung
(74) *Attorney, Agent, or Firm* — Shumaker & Sieffert, P.A.

(57) ABSTRACT

In some examples, a network device may determine whether a first egress network device is segment routing (SR) aware. Based on the first egress network device being SR aware, the network device may initiate establishment of an SR tunnel toward the first egress network device. The network device may forward multicast traffic on the SR tunnel. The network device may also determine whether a second egress network device is SR aware. Based on the second egress network device not being segment routing aware, the network device may initiate establishment of a non-SR tunnel toward the second egress network device. The network device may forward multicast traffic on the non-SR tunnel.

18 Claims, 7 Drawing Sheets

(51) Int. Cl.
  *H04L 12/715* (2013.01)
  *H04L 12/761* (2013.01)
  *H04L 45/50* (2022.01)
  *H04L 45/00* (2022.01)
  *H04L 45/16* (2022.01)

(56) References Cited

U.S. PATENT DOCUMENTS

| | | | | |
|---|---|---|---|---|
| 2018/0324090 | A1* | 11/2018 | Duncan | H04L 12/4641 |
| 2020/0119991 | A1 | 4/2020 | Dutta | |
| 2020/0120020 | A1* | 4/2020 | Dutta | H04L 12/66 |
| 2021/0306167 | A1* | 9/2021 | Dutta | H04L 45/50 |

OTHER PUBLICATIONS

Filsfils et al. "Segment Routing Architecture" Internet Engineering Task Force (IETF), RFC 8402, Jul. 2018, 32 pp.

Filsfils et al. "Segment Routing Use Cases" draft-filsfils-spring-segment-routing-use-cases-01, Network Working Group, Internet-Draft, Oct. 21, 2014, 35 pp.

Filsfils et al. "Segment Routing Policy Architecture" draft-ietf-spring-segment-routing-policy-06.txt, SPRING Working Group, Internet-Draft, Dec. 14, 2019, 35 pp.

Previdi et al., "Source Packet Routing in Networking (SPRING) Problem Statement and Requirements," RFC 7855, Internet Engineering Task Force (IETF), May 2016, 19 pp.

Rosen et al. "Multicast in MPLS/BGP IP VPNs" Internet Engineering Task Force (IETF), RFC 6513, Feb. 2012, 88 pp.

Aggarwal et al., "BGP Encodings and Procedures for Multicast in MPLS/BGP IP VPNs," RFC 6514, Internet Engineering Task Force (IETF), Feb. 2012, 59 pp.

Bashandy et al. "Segment Routing with the MPLS Data Plane" RFC 8660, Internet Engineering Task Force (IETF), Dec. 2019, 29 pp.

* cited by examiner

INGRESS REPLICATION PROCEDURES TO FACILITATE MIGRATION TO SEGMENT ROUTING TECHNOLOGY IN A COMPUTER NETWORK

This application claims the benefit of IN Provisional Application No. 202041019223 filed May 6, 2020, the entire content of which is herein incorporated by reference.

TECHNICAL FIELD

The disclosure relates to computer networks and, more particularly, to distribution of multicast traffic over computer networks.

BACKGROUND

A computer network is a collection of interconnected computing devices that exchange data and share resources. In a packet-based network, the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. For example, the computer network may utilize border gateway protocol (BGP) or protocol independent multicast (PIM) as a multicast routing protocol to build distribution trees through the computer network for the transmission of multicast traffic between sources and receivers within customer sites for particular multicast groups. In addition, the computer network may be configured to support multicast VPNs (MVPNs) to enable Internet Protocol (IP) multicast traffic to travel between sources and receivers within customer sites. For one or more MVPNs, provider edge (PE) routers coupled to the customer sites may conceptually build a multicast tree to carry multicast traffic from a multicast source through the public network so that the customer sites receive the multicast traffic as if the customer sites were directly attached to the same private network as the source.

SUMMARY

In general, this disclosure describes techniques for creating tunnels for multicast traffic within a computer network. The disclosed techniques may be used in a scenario where an ingress router may be Segment Routing (SR) capable or aware and other routers within the computer network may be either SR aware or SR unaware.

The techniques of this disclosure provide the ability for ingress PE routers to the MVPN network to determine which egress PE routers are SR capable or aware and which egress PE routers are SR incapable or unaware, and initiate the establishment of SR tunnels such as SR-TE tunnels for SR capable or aware egress PE routers and non-SR tunnels, such as RSVP tunnels (e.g., RSVP-TE tunnels) for egress PE routers that are SR incapable or unaware so as to deliver multicast traffic to receivers accessing the traffic via the egress PE routers. In some examples, the ingress PE router may receive Type-1 MVPN routes or Type-4 MVPN routes from the egress PE routers. The egress PE routers may advertise SR capability or lack thereof, through for example, a Border Gateway Protocol (BGP) extended community attribute attached to Type-1 MVPN routes or Type-4 MVPN routes. The ingress PE router may also send a Type-1 MVPN route or a Type-4 MVPN route advertising SR capability through an attached BGP extended community attribute attached. The ingress PE router may determine which egress PE routers are SR aware or capable based on the BGP extended community attribute attached to the Type-1 MVPN routes or the Type-4 MVPN routes. The ingress PE router may initiate establishment of SR tunnels towards the egress PE routers that are SR aware and initiate establishment of non-SR tunnels to the egress PE routers that are not SR aware. The ingress PE router may forward multicast traffic on the SR tunnels and non-SR tunnels.

In another example, the ingress PE router may determine which egress PE routers are SR aware by looking up the egress PE routers in a static policy or of MVPN egress network devices that is created by a network operator indicative of which egress network devices are SR aware created by a network operator. In yet another example, the ingress PE router may determine which egress PE routers are SR aware based on whether there is an existing unicast SR tunnel to the egress PE router. In either example, the ingress PE router may then initiate the establishment of SR tunnels for SR capable or aware egress PE routers and non-SR tunnels for egress PE routers that are SR incapable or unaware so as to deliver multicast traffic to receivers accessing the traffic via the egress PE routers.

In one example aspect, a method includes determining, by an ingress network device, whether a first egress network device is segment routing (SR) aware; based on the first egress network device being SR aware, initiating, by the ingress network device, establishment of an SR tunnel toward the first egress network device; forwarding, by the ingress network device, multicast traffic on the SR tunnel; determining, by the ingress network device, whether a second egress network device is SR aware; based on the second egress network device not being segment routing aware, initiating, by the ingress network device, establishment of a non-SR tunnel toward the second egress network device; and forwarding, by the ingress network device, multicast traffic on the non-SR tunnel.

In another example aspect, a network device includes at least one computer processor, and a memory comprising instructions that when executed by the at least one computer processor cause the at least one computer processor to determine whether a first egress network device is SR aware; based on the first egress network device being SR aware, initiate establishment of an SR tunnel towards the first egress network device; forward multicast traffic on the SR tunnel; determine whether a second egress network device is SR aware; based on the second egress network device not being segment routing aware, initiate establishment of a non-SR tunnel towards the second egress network device; and forward multicast traffic on the non-SR tunnel.

In a further example aspect, a non-transitory computer-readable storage medium is encoded with instructions that, when executed, cause at least one processor of a computing device to determine whether a first egress network device is SR aware; based on the first egress network device being segment routing aware, initiate establishment of an SR tunnel toward the first egress network device; forward multicast traffic on the SR tunnel; determine whether a second egress network device is SR aware; based on the second egress network device not being SR aware, initiate establishment of a non-SR tunnel toward the second egress network device; and forward multicast traffic on the non-SR tunnel.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
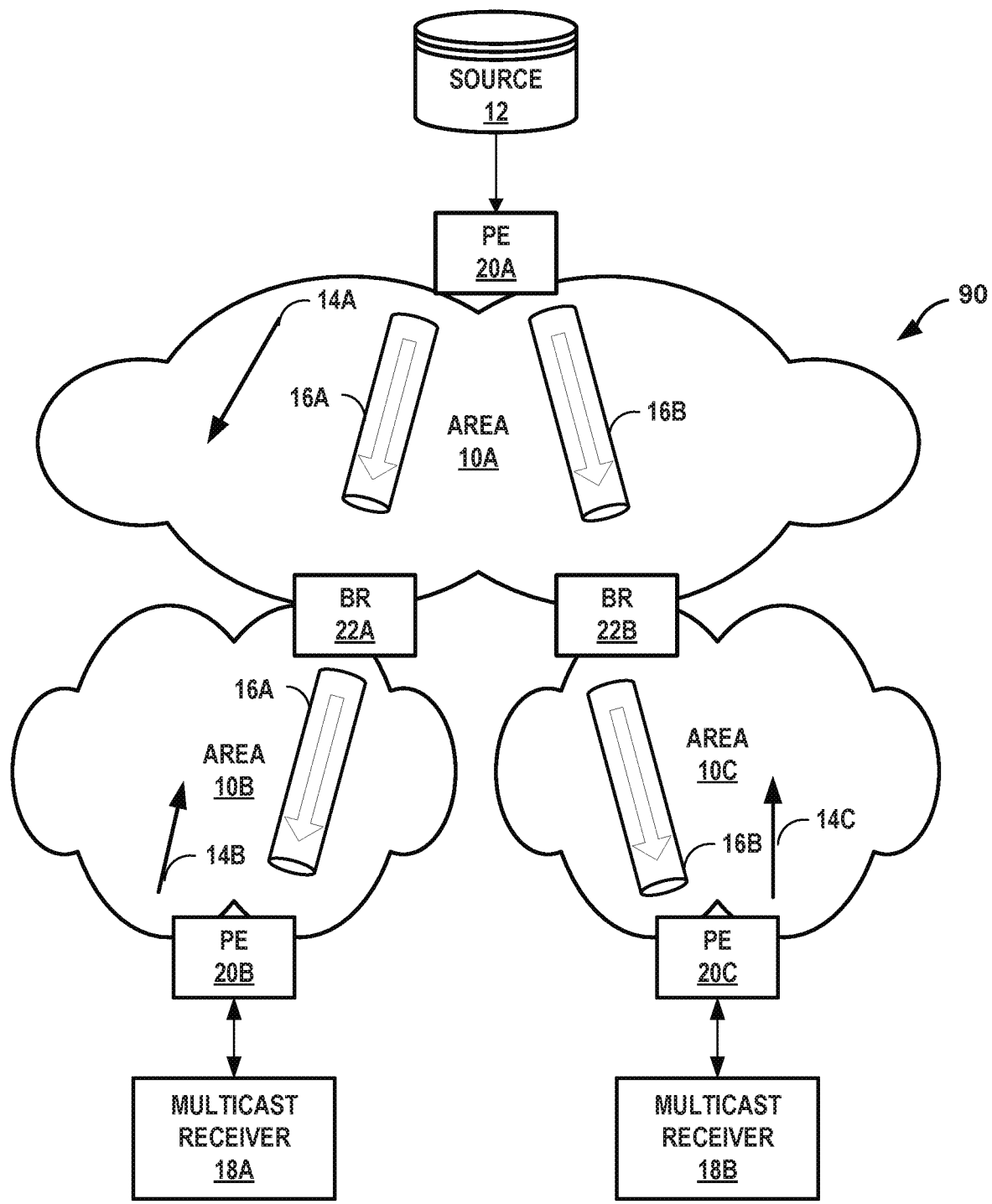
FIG. 1 is a block diagram of an example computer network including network devices within multiple areas configured to transmit multicast traffic between one or more multicast sources and multicast receivers according to the techniques of this disclosure.

One way tunnels are created or established in a Multicast Virtual Private Network (MVPN) is through MVPN Ingress Replication (IR). MVPN IR can operate in two modes, namely to use an existing peer-to-peer (P2P) tunnel or to create or establish a new P2P tunnel. When MVPN IR uses an existing P2P tunnel, the MVPN may make use of any existing P2P tunnel to MVPN egress PE routers. These existing tunnels could be P2P tunnels used for unicast traffic that may also be used for multicast traffic. For example, the existing tunnels may be established using any of Label Distribution Protocol (LDP)/Resource Reservation Protocol (RSVP)/Segment Routing (SR)/Border Gateway Protocol-Labeled Unicast (BGP-LU), or the like.

Currently, when MVPN IR creates or establishes a new P2P tunnel, the MVPN IR establishes a new non-SR tunnel (e.g., an RSVP tunnel). In this mode of operation, for example, the MVPN module would signal an RSVP with traffic engineering (RSVP-TE) module to initiate the establishment of a new P2P-TE tunnel to each MVPN egress PE router. These new P2P-TE tunnels could then be used for carrying multicast traffic. This mode may be used, for example, when there is a customer requirement to create a dedicated TE path for carrying multicast traffic.

Many networking customers desire to use dedicated tunnels for multicast traffic. As networks migrate from RSVP and other routing protocols to the SR paradigm, a problem may arise as network devices, such as PE routers, may not know which devices are SR aware. This problem may arise because migration occurs in phases. For example, a given network operator may upgrade equipment based on equipment age or add newer equipment, which may be SR aware, as the network expands. In some examples of a multi-area autonomous system (AS) or a multi-AS computer network, a given network operator may upgrade their network equipment to support the SR paradigm within one of the areas, while the given network operator or another network operator may not upgrade the network equipment in another of the areas. Thus, as network migration typically does not all occur at once, the computer network may include different network equipment with different capabilities. For example, a given PE router may be upgraded to be SR capable or aware or may be replaced by an SR aware PE router. Other legacy PE routers may still utilize RSVP or other routing protocols. Therefore, techniques to determine which PE routers are SR aware and which are SR unaware, and initiate the establishment of tunnels based on the capabilities of a given PE router may be desirable.

One way to address this issue would be to only create new tunnels for MVPNs from an ingress PE router to egress PE routers that are SR capable. However, this would leave egress PE routers that are not SR capable unable to receive multicast traffic. To accomplish this, the MVPN module of the ingress PE router, would utilize an SR-TE module to attempt to create a new SR-TE P2P tunnel to the egress PE routers. SR-TE P2P tunnels from the ingress PE router to the egress PE routers that are SR capable would be successfully established and multicast traffic would successfully flow to those egress PE routers that are SR capable. SR-TE P2P tunnels from the ingress PE router to egress PE routers that are not SR capable would not be established and would remain down and those egress PE routers that are not SR capable would not receive multicast traffic.

Another way to address this issue would be for the MVPN module of the ingress PE router to only create non-SR tunnels, such as RSVP-TE tunnels. The MVPN module of the ingress PE router, would utilize a non-SR-TE module (e.g., an RSVP-TE) module to create new non-SR tunnels to the egress PE routers. The non-SR tunnels from the ingress PE router to all of the egress PE routers would be successfully established and multicast traffic would be flow to those PE routers. However, this situation does not meet a customer requirement of creating new SR-TE tunnels for carrying multicast traffic.

Yet another way to address this issue would be for the MVPN module of the ingress PE router to attempt to create both SR-TE tunnels and non-SR tunnels, such as RSVP-TE tunnels, for each egress PE router. For example, the MVPN module of the ingress PE router may utilize both a non-SR-TE module and an SR-TE module to create new tunnels to the egress PE routers. Non-SR tunnels (e.g., RSVP-TE P2P tunnels) from the ingress PE router to all of the egress PE routers would be successfully established. SR tunnels (e.g., SR-TE P2P tunnels) from the ingress PE router to egress PE routers that are SR capable would be successfully established. SR tunnels from the ingress PE router to egress PE routers that are not SR capable would remain down. The ingress PE router may then push multicast traffic over the SR tunnels to reach SR capable egress PE routers and over the non-SR tunnels to reach the other PE routers. However, this approach may leave behind many stale or unused non-SR tunnels. For example, egress PE routers that are both non-SR capable and SR capable would have an unused non-SR tunnel created or a non-SR tunnel carrying the same traffic as the SR tunnel.

According to the techniques of this disclosure, an ingress PE router may determine which egress PE routers in the network are SR aware and which are not SR aware based on advertisements received from the egress PE routers, and initiate the creation of SR tunnels for those egress PE routers that are SR aware and initiate the creation of non-SR tunnels for those egress PE routers that are not SR aware. For example, an ingress network device may determine whether a first egress network device is SR aware; based on the first egress network device being SR aware, initiate establishment of an SR tunnel towards the first egress network device; and forward multicast traffic on the SR tunnel. The ingress network device may also determine whether a second egress network device is SR aware; based on the second egress network device not being segment routing aware, initiate establishment of a non-SR tunnel towards the second egress network device; and forward multicast traffic on the non-SR tunnel.

In some examples, a new Border Gateway Protocol (BGP) extended community attribute may be created to indicate SR capability of a particular MVPN PE router. In some examples, the new BGP extended community attribute may be called "Segment-Routing." For example, every MVPN PE router may construct the "Segment-Routing" extended community attribute as follows: the Global Administrator field is set to 1, if the MVPN PE router is Segment-Routing aware or else the Global Administrator field is set to 0. The Local Administrator field is always set to 0. In this example, Segment-Routing: 1:0 indicates MVPN PE routers that are SR aware (capable) and Segment-Routing: 0:0 indicates MVPN PE routers that are SR unaware (uncapable).

This "Segment-Routing" extended community attribute may be attached to each Type-1 MVPN route or Type-4 MVPN router originated by every MVPN PE router and advertised to every other MVPN PE router within the network. Attaching "Segment-Routing" extended community attribute may be triggered via new MVPN knob. For example, the MVPN knob may trigger attachment of the BGP extended community attribute to Type-1 MVPN routes or Type-4 MVPN routes.

In some examples, every MVPN PE router may convey information on whether it is SR aware or not by tagging a new extended community attribute to each Type-1 MVPN route or each Type-4 MVPN route. In some examples, if an MVPN PE router advertises Type-1 MVPN routes or Type-4 MVPN routes without Segment-Routing extended community attribute, the MVPN PE router is considered to be SR unaware.

The MVPN module of the ingress PE router may then trigger non-SR tunnels (e.g., RSVP-TE tunnels) on all legacy (SR unaware) egress PE routers and SR tunnels (e.g., SR-TE tunnels) on SR aware egress PE routers. In some examples, the ingress PE router may compute how to create the tunnels. In other examples, a network controller may compute how to create the tunnels an provide an indication to the ingress PE router on how to create the tunnels.

FIG. 1 is a block diagram of an example computer network including network devices within multiple areas configured to transmit multicast traffic between one or more multicast sources and multicast receivers according to the techniques of this disclosure.

In the example of FIG. 1, multiple PE routers 20A-20C and other border routers (BR) 22A-22B are depicted. A network, such as network 90, may be partitioned into multiple Interior Gateway Protocol (IGP) domains or areas that include a set of routers under common administrative control and that share a common routing protocol. Example IGPs include Intermediate System-Intermediate System (IS-IS) and Open Shortest Path First (OSPF). For instance, network 90 includes three areas 10A, 10B, and 10C. Ingress PE router 20A, BR 22A and BR 22B are connected to area 10A. Egress PE router 20B and BR 22A are connected to area 10B. Egress PE router 20C and BR 22B are connected to area 10C. Nodes in a given area typically do not store data describing nodes and routes within other areas, including prefixes and SIDs. For instance, a router in a first IGP area does not typically store a link state database (LSDB) or traffic engineering database (TED) and corresponding prefixes and segment identifiers (SID)s for any other IGP area.

Area 10A, area 10B and area 10C may comprise private networks or public networks, such as the Internet. For example, any of area 10A, area 10B and area 10C may be an enterprise network, a campus network, a service provider network, a home network, a local area network (LAN), a virtual local area network (VLAN), virtual private network (VPN), or another autonomous system. In any of these examples, remotely located multicast data source 12 and multicast receivers 18A and 18B may share data via area 10A and area 10B or area 10C. Area 10A, area 10B and area 10C each may be MPLS networks.

Ingress PE router 20A is connected to multicast data source 12 which may be located outside of the network, such as outside of area 10A. PE router 20B is connected to multicast receiver 18A for providing the multicast data from multicast data source 12 to a user. Similarly, PE router 20C is connected to multicast receiver 18B for providing the multicast data from multicast data source 12 to another user. PE routers 20A-20C operate on the edge of areas 10A, 10B and 10C. Ingress PE router 20A is an ingress router in that ingress PE router 20A provides the multicast data from multicast data source 12 into area 10A. Egress PE router 20B and egress PE router 20C are egress routers in that egress PE router 20B and egress PE router 20C take the multicast data from area 10B and area 10C, respectfully, to provide the multicast data to multicast receiver 18A and multicast receiver 18B, respectively.

The ingress PE router may receive multicast traffic from outside network 90 (initiated by a multicast source), initiate establishment of SR tunnels where appropriate or non-SR tunnels where appropriate and forward the multicast traffic into MPLS network through the tunnels toward multicast receivers. The egress PE routers receive the multicast traffic from network 90 and forward the multicast traffic towards multicast receivers external to network 90.

In the example illustrated in FIG. 1, multicast data source 12 may provide multicast traffic for one or more multicast groups, and receivers 18A and 18B may request or subscribe to traffic from one or more multicast groups. In the example of FIG. 1, area 10A, area 10B and area 10C each include network devices that use multicast routing protocols, such as Protocol Independent Multicast (PIM) or Border Gateway Protocol (BGP), to route multicast traffic through area 10A, area 10B and area 10C between multicast data source 12 and multicast receivers 18A and 18B for particular multicast groups. In some examples, area 10A, area 10B and area 10C may include one or more multicast virtual private networks (MVPNs) to enable multicast traffic to travel between multicast data source 12 and multicast receivers 18A and 18B. The MVPNs may be established between PE routers 20A-20C of network 10. The PIM protocol may operate in several different modes, including Dense Mode (DM), Sparse Mode (SM) in Source-Specific Multicast (SSM) mode or Any Source Multicast (ASM) mode, and Bidirectional (BIDIR) mode.

Each of multicast data source 12, receiver 18A and receiver 18B may be included in a remote customer site (not shown) that may be a local area network (LAN) or a wide area network (WAN) comprising a plurality of subscriber devices, such as desktop computers, laptops, workstations, PDAs, wireless devices, network-ready appliances, file servers, print servers or other devices. The remote sites may be configured to support multicast traffic, such as Internet Protocol Television (IPTV), desktop conferences, corporate broadcasts, music and video web casts, and other forms of multimedia content.

In some examples, area 10A, area 10B and area 10C may include unicast upstream multicast hop (UMH) and Selective Provider Tunnels (also referred to herein as "selective tunnels"). Inclusive Provider Tunnels (also referred to herein as "inclusive tunnels") may be configured on the PE routers, such that any multicast packet that is sent by ingress PE router 20A into area 10A will be received by all the PE routers connected to area 10A, area 10B or area 10C for that MVPN irrespective of whether the PE routers have interested listeners (receivers). That is, when using inclusive provider tunnels an ingress PE router injects multicast traffic in the MVPN by forwarding the traffic on all tunnels regardless of whether a receiver has expressly issued a join request for the multicast source and group. For example, any multicast traffic received by ingress PE router 20A from multicast data source 16 would be forwarded on respective inclusive tunnels to both PE routers 20B and 20C. In contrast, Selective Provider Tunnel mode may be configured on PE routers such that traffic sent by a particular PE router is delivered to subset of PE routers in a given MVPN instance that have signaled interested receivers, rather than to all PE routers in the MVPN instance.

Segment routing, which may also be referred to as source packet routing or source packet routing in networking (SPRING), is a control-plane architecture that enables an ingress router to steer a packet through a specific set of nodes and links in a network without relying on intermediate nodes in the network to determine the path it should take.

In the example of FIG. 1, ingress PE router 20A and egress PE router 20C may use segment routing techniques, e.g., a SPRING paradigm, to advertise segments between nodes using an IGP or BGP and build single or multi-hop tunnels within each area 10A and 10C. Segment routing may engage IGPs or BGP for advertising multiple types of segments. A first example type of segment is an "adjacency segment" that represents a strict-forwarded, typically single-hop tunnel that carries packets over a specific link between a router and a specific node, irrespective of the link cost. A second example type of segment is a "prefix segment" that represents a typically multi-hop tunnel using least cost path links between a router and to a specific address prefix. A third example type of segment is a "binding segment" that represents a specific intra-domain tunnel between a router and a specific node or a specific address prefix.

In segment routing, the "path" information for segments is disseminated between the routers within each of areas 10A and 10C as part of the IGP link state information for the respective area. Ingress PE router 20A is able to steer a packet through an ordered list of instructions or segments by prepending one or more segment identifiers (SIDs) to the packet. In other words, ingress router 20A can steer a packet through a desired set of nodes and links by prepending the packet with an appropriate combination (stack) of SIDs. Segment routing allows routers to enforce a flow through any topological path and service chain while maintaining per-flow state only at the ingress node to each domain.

Segment routing can be directly applied to the MPLS architecture with no change in the forwarding plane. A network administrator or centralized controller need only allocate SIDs to particular routers and the segment routing control plane architecture automatically builds the required MPLS forwarding constructs from a router to any other router. A SID is encoded as an MPLS label, and an ordered list of SIDs is encoded as a stack of labels. The SID of the segment to be processed is on the top of the stack and, upon completion of a segment, the related label is popped from the stack as the packet is forwarded through the network.

Segment routing is further described in Filsfils, et al., "Segment Routing Architecture," IETF RFC 8402, July 2018, while Segment Routing use cases are described in Filsfils, et al., "Segment Routing Use Cases," IETF Internet-Draft draft-filsfils-spring-segment-routing-use-cases-01, Oct. 21, 2014, each of which is incorporated herein by reference. Further details regarding SPRING are found in (1) Filsfils, et al., "Segment Routing Policy Architecture," IETF Internet-Draft draft-ietf-spring-segment-routing-policy-06, Dec. 14, 2019; (2) Previdi, et al., "Source Packet Routing in Networking (SPRING) Problem Statement and Requirements," IETF RFC 7855, May 2016; and (3) Bashandy, et al., "Segment Routing with MPLS data plane," IETF RFC 8660, December 2019, each of which is incorporated herein by reference.

MVPN auto-discovery may be provided by a unicast routing protocol, such as BGP, used to discover and maintain MVPN memberships of PE routers within a network, such as areas 10A, 10B and 10C. BGP MVPN (sometimes referred to as "Next Generation (NG) MVPN") introduces a BGP control plane in the provider network for handling multicast. As described in further detail below, PE routers 20A-20C use BGP control plane messages ("routes") for coordinating delivery of the multicast traffic. BGP MVPN introduces the concept of Provider Multicast Service Interfaces (PMSI) to bring separation between the "service" and "transport" mechanisms. A PMSI is a conceptual "overlay" on the provider network (P-network) that refers to a "service." This "overlay" can take packets from one PE router belonging to a particular MVPN and deliver them to other or all the PE routers belonging to that same MVPN. BGP MVPN is responsible for three major functions: 1. Auto-discovery, 2. P-Tunnel Signaling, and 3. customer multicast (C-MCAST) Route Signaling. Auto-discovery is the process of finding all of the PE routers participating in a given MVPN instance. P-Tunnel signaling provides a way for PE routers to tell other PE routers what method they are going to use for transporting C-Multicast traffic (i.e., for establishing the PMSI tunnels). Options for establishing PMSI tunnels (which include inclusive provider tunnels and selective provider tunnels) include point-to-multipoint (P2MP) RSVP-TE, P2MP mLDP, multi-point-to-multipoint (MP2MP) mLDP, multicast Generic Routing Encapsulation (mGRE) or Ingress replication. C-MCAST Route Signaling is a way of exchanging C-Multicast control plane state, such as C-Join, C-Prunes and C-Register messages between relevant PE routers.

BGP MVPN uses selective provider tunnels, or selective provider multicast service interface (S-PMSI), and inclusive provider tunnels, or inclusive provider multicast service interface (I-PMSI). In selective provider tunnels (S-PMSI), traffic sent by a particular PE router is delivered to subset of PE routers in a given MVPN instance, rather than to all PE routers in the MVPN instance. Creating a selective provider tunnel enables an ingress PE router to move high-rate traffic off the inclusive tunnel and deliver the multicast traffic only to receivers that request it. This can improve bandwidth utilization.

PE routers participating in BGP MVPNs that use the BGP control plane use seven types of BGP MVPN routes (messages), five of which are used for auto-discovery and two for C-multicast protocol information exchange between provider edge (PE) routers. For example, PE routers 20 advertise their MVPN membership to other PE routers 20 using BGP, and PE routers 20 exchange BGP routing protocol messages to advertise various types of routes for controlling multicast distribution within the network.

For example, in a BGP MVPN, an MVPN Type-1 route is an intra-AS inclusive provider multicast service interface (I-PMSI) auto discovery (AD) route that is originated by all PE routers participating in an MVPN. The MVPN Type-1 route includes a route type indicator, an originating router route distinguisher (RD), and an originating router loopback address. An MVPN Type-1 route may also include an extended community attribute, such as a Segment-Routing extended community attribute according to the techniques of this disclosure.

An MVPN Type-2 route is an inter-AS I-PMSI AD Route that is originated by all ASBR PE routers. The MVPN Type-2 route includes a route type indicator, an originating router RD, and an AS number of the originating ASBR.

An MVPN Type-3 route is a selective provider multicast service interface (S-PMSI) AD Route that is originated by the sender PE router (the sender PE router that initiates the S-PMSI). The MVPN Type-3 route includes a route type indicator, an originating router RD, Customer multicast Source address (C-S) Mask (32 for IPv4; 128 for IPv6), C-S Using S-PMSI, Customer multicast Group address (C-G) Mask (32 for IPv4; 128 for IPv6), C-G Using S-PMSI, and originating Router Loopback Address.

An MVPN Type-4 route is a leaf AD Route that is originated by receiver PE routers in response to receiving S-PMSI AD routes with the "leaf information required" flag set from the sender PE router. The MVPN Type-4 route includes a route type indicator, an S-PMSI AD route, and an originating router loopback address. An MVPN Type-4 route may also include an extended community attribute, such as a Segment-Routing extended community attribute according to the techniques of this disclosure.

An MVPN Type-5 route is a source active AD Route that is originated by the PE router that discovers an active VPN multicast source. The MVPN Type-5 route includes a route type indicator, an originating router RD, C-S Mask (32 for IPv4; 128 for IPv6), Customer multicast Source address, C-G Mask (32 for IPv4; 128 for IPv6), Customer multicast Group address.

An MVPN Type-6 route is a shared tree join route that is originated by the receiver PE router (the PE router that receives a (C-*, C-G) join message from a VPN interface).

The MVPN type 6 route includes a route type indicator, RD of Upstream PE router (towards Customer Rendezvous Point (C-RP)), AS Number of Upstream PE router (towards C-RP), C-RP Mask (32 for IPv4; 128 for IPv6), Customer Rendezvous Point Address, C-G Mask (32 for IPv4; 128 for IPv6), and Customer multicast Group address.

An MVPN Type-7 route is a source tree join route that is originated by the receiver PE router (the PE router that receives a local (C-S, C-G) join message or the PE router that already has a Type-6 route and receives a Type-5 route). The MVPN Type-7 route includes a route type indicator, RD of Upstream PE router (towards C-S), AS Number of Upstream PE router (towards C-S), C-S Mask (32 for IPv4; 128 for IPv6), Customer multicast Source Address, C-G Mask (32 for IPv4; 128 for IPv6), and Customer multicast Group address.

Additional information regarding MVPN may be found in Rosen, E., et al., "Multicast in MPLS/BGP IP VPNs," RFC 6513, February 2012, and Aggarwal, E., et al., "BGP Encodings and Procedures for Multicast in MPLS/BGP IP VPNs," RFC 6514, February 2012, the entire contents of each of which are incorporated by reference herein.

In the example of FIG. 1, ingress PE router 20A, egress PE router 20B and egress PE router 20C each have Type-1 routes with an attached extended community attribute of Segment-Routing. For example, ingress PE router 20A may have Type-1 route 14A with PMSI tunnel type as "IR" and extended community attribute Segment-Routing: 1:0, indicating that ingress PE router 20A is SR aware. Egress PE router 20B may have Type-1 route 14B with extended community attribute Segment-Routing: 0:0, indicating that egress PE router 20B is not SR capable. Egress PE router 20C may have Type-1 route 14C with extended community attribute Segment-Routing: 1:0, indicating that egress PE router 20C is SR capable. Therefore, the MVPN module on ingress PE router 20A, knows that egress PE router 20C is SR aware and egress PE router 20B is not SR aware based on the SR extended community attribute received in the Type-1 routes.

In the case of an inclusive tunnel (I-PMSI), ingress PE router 20A processes the received Type-1 MVPN routes and decides to create a non-SR tunnel (e.g., an RSVP-TE P2P tunnel) or an SR tunnel (e.g., an SR-TE P2P tunnel) based on the extended community attribute Segment-Routing. The MVPN module of the ingress PE router 20A, would utilize either a non-SR-TE module (e.g., an RSVP-TE module) or an SR-TE module based on SR awareness of a particular egress PE router. For example, the MVPN module on ingress PE router 20A would utilize an SR-TE module to create new SR tunnel 16B through area 10A, BR 22B, and area 10C to egress PE router 20C. The MVPN module on ingress PE router 20A, would utilize a non-SR-TE module (e.g., an RSVP-TE module) to create new non-SR tunnel 16A through area 10A, BR 22A, and area 10B to egress PE router 20B. In the case of a selective tunnel (S-PMSI), ingress PE router 20A may process the received Type-1 and Type-4 MVPN routes and decide to create a non-SR tunnel or an SR tunnel based on the extended community attribute Segment-Routing.

An ingress replication tunnel rooted at ingress PE router 20A may then bind to the non-SR tunnel and the SR tunnel. Ingress PE router 20A would push multicast traffic over SR tunnel 16B towards egress PE router 20C and over non-SR tunnel 16A towards egress PE router 20B. In this manner, an MVPN may push multicast traffic to all egress PE routers over new tunnels without leaving stale, unused or unnecessary tunnels. At a later point, if egress PE router 20B becomes SR aware, ingress PE router 20A may create a new SR tunnel to egress PE router 20B and switch the multicast traffic to the newly created SR Tunnel. Ingress PE router 20A may then delete, tear down or flush non-SR tunnel 16A.

Figure 2:
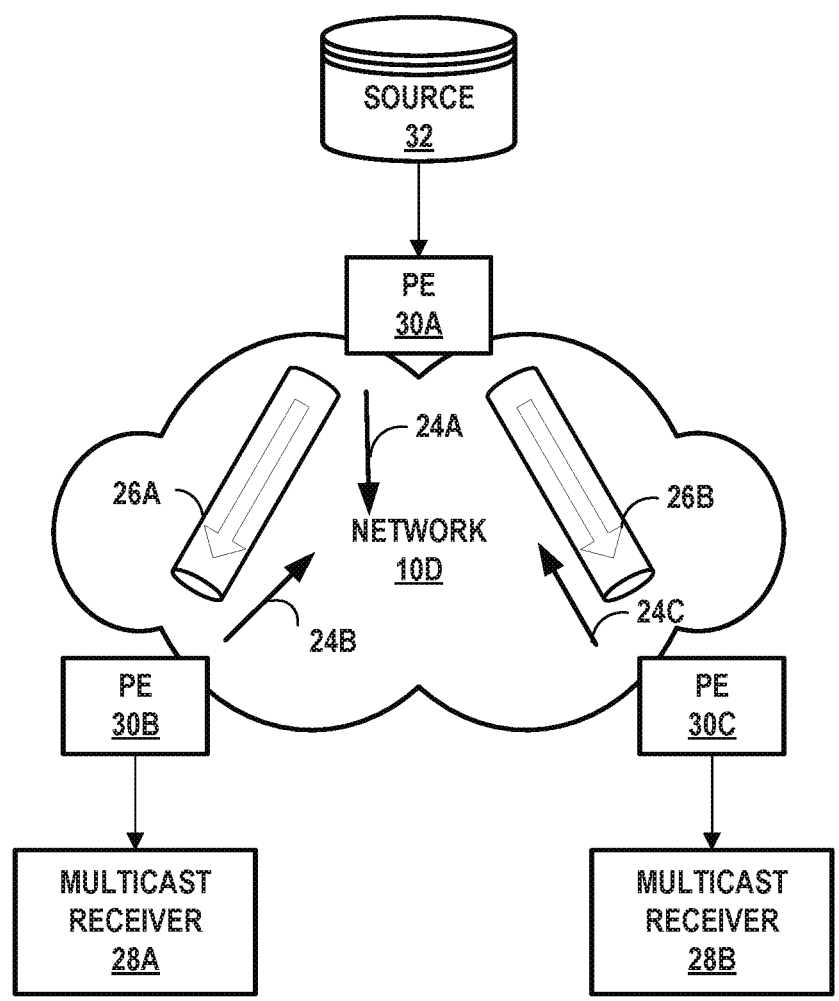
FIG. 2 is a block diagram of an example computer network including network devices within a single autonomous system configured to transmit multicast traffic between one or more multicast sources and multicast receivers according to the techniques of this disclosure.

FIG. 2 is a block diagram of an example computer network including network devices within a single autonomous system configured to transmit multicast traffic between one or more multicast sources and multicast receivers according to the techniques of this disclosure. In an example of network 10D as an enterprise network, multicast data source 32 and multicast receivers 28 may comprise one or more servers or employee computer terminals located in different regions of a single office location, or may comprise a remote office location of a corporation.

Multicast data source 32 is connected to ingress PE router 30A. Multicast receiver 28A is connected to egress PE router 30B and multicast receiver 28B is connected to egress PE router 30C. Multicast data source 32, multicast receiver 28A and multicast receiver 28B may operate similarly to multicast data source 12, multicast receiver 18A and multicast receiver 18B as described above with respect to FIG. 1.

Each MVPN PE router, ingress PE router 30A, egress PE router 30B and egress PE router 30C may have Type-1 routes. For example, ingress PE router 30A may have Type-1 route 24A with PMSI tunnel type as "IR" and extended community attribute Segment-Routing: 1:0, indicating that ingress PE router 30A is SR capable. Egress PE router 30B may have Type-1 route 24B with extended community attribute Segment-Routing: 0:0, indicating that egress PE router 30B is not SR capable. Egress PE router 30C may have Type-1 route 24C with extended community attribute Segment-Routing: 1:0, indicating that egress PE router 30C is SR capable.

In the case of an inclusive tunnel (I-PMSI), ingress PE router 30A processes the received Type-1 MVPN routes and decides to create a non-SR tunnel (e.g., an RSVP-TE P2P tunnel) or an SR tunnel (e.g., an SR-TE P2P tunnel) based on the extended community attribute Segment-Routing. Ingress PE router 30A may initiate establishment of non-SR tunnel 26A to egress PE router 30B through network 10D. Ingress PE router 30A may also initiate establishment of SR tunnel 26B to egress PE router 30C through network 10D. An ingress replication tunnel rooted at ingress PE router 30A may then bind to non-SR tunnel 26A and SR tunnel 26B. In the case of a selective tunnel (S-PMSI), ingress PE router 30A may process the received Type-1 and Type-4 MVPN routes and decide to create a non-SR tunnel or an SR tunnel based on the extended community attribute Segment-Routing.

Figure 3:
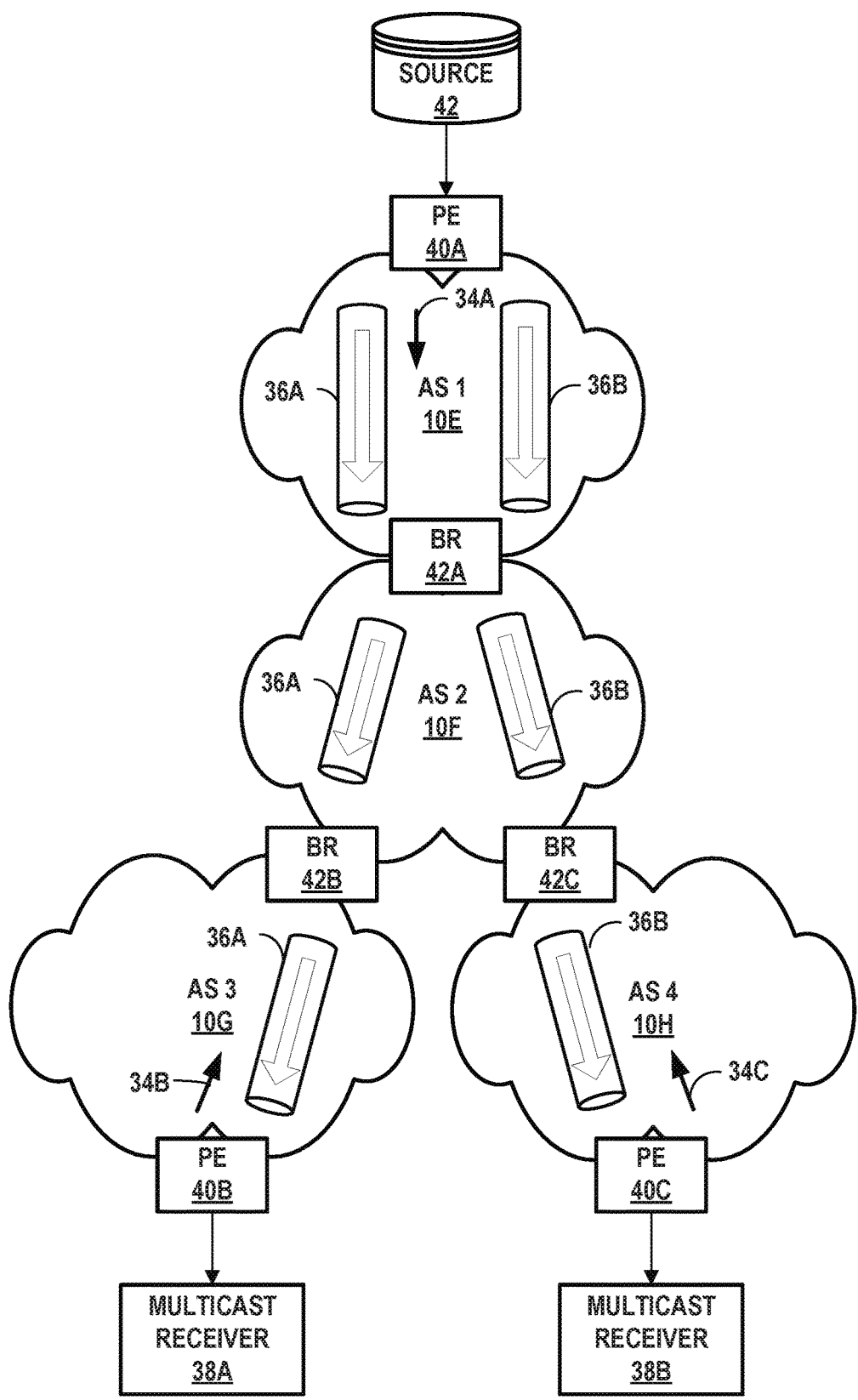
FIG. 3 is a block diagram of an example computer network including network devices within multiple autonomous systems configured to transmit multicast traffic between one or more multicast sources and multicast receivers according to the techniques of this disclosure.

FIG. 3 is a block diagram of an example computer network including network devices within multiple autonomous systems configured to transmit multicast traffic between one or more multicast sources and multicast receivers according to the techniques of this disclosure.

Multicast data source 42 is connected to ingress PE router 40A. Multicast receiver 38A is connected to egress PE router 40B and multicast receiver 38B is connected to egress PE router 40C. Multicast data source 42, multicast receiver 38A and multicast receiver 38B may similarly to multicast data source 12, multicast receiver 18A and multicast receiver 18B as described above with respect to FIG. 1.

Each MVPN PE router, ingress PE router 40A, egress PE router 40B and egress PE router 40C exchange Type-1 messages. For example, ingress PE router 40A may send a Type-1 message with PMSI tunnel type as "IR" and extended community attribute Segment-Routing: 1:0, indicating that ingress PE router 40A is SR capable. Egress PE router 40B may send a Type-1 message with extended community attribute Segment-Routing: 0:0, indicating that egress PE router 40B is not SR capable. Egress PE router 40C may send a Type-1 message with extended community attribute Segment-Routing: 1:0, indicating that egress PE router 40C is SR capable.

In the case of an inclusive tunnel (I-PMSI), ingress PE router 40A processes the received Type-1 MVPN routes and decides to create a non-SR tunnel (e.g., an RSVP-TE P2P tunnel) or an SR tunnel (e.g., an SR-TE P2P tunnel) based on the extended community attribute Segment-Routing. Ingress PE router 40A may initiate establishment of non-SR tunnel 36A to egress PE router 40B through AS1 10E, ND42A, AS2 10F, ND42B and AS 3 10G. Ingress PE router 40A may also initiate establishment of SR tunnel 36B to egress PE router 20C through AS1 10E, ND42A, AS2 10F, ND42C and AS 4 10H. An ingress replication tunnel rooted at ingress PE router 20A may then bind to non-SR tunnel 36A and SR tunnel 36B. In the case of a selective tunnel (S-PMSI), ingress PE router 40A may process the received Type-1 and Type-4 MVPN routes based on the extended community attribute Segment-Routing and decide to create a non-SR tunnel or an SR tunnel.

Signaling with Provider Multicast Service Interface (PMSI) is now further discussed. In the example of an inclusive tunnel: I-PMSI, the ingress PE router, e.g., ingress PE router 20A from FIG. 1, may process received Type-1 MVPN routes with attached BGP extended community attribute and create a list indicative of egress PE routers that are SR aware and another list indicative of egress PE routers that are not SR aware. In some examples, the lists may be stored together as a table. The MVPN module of the ingress PE router may make use of existing IR procedures to create non-SR tunnels (e.g., RSVP-TE tunnels) to all egress PE routers that are SR unaware. For example, a network device, such as the ingress PE router, may create a list indicative of egress network devices that are SR aware based on the BGP extended community attribute. The network device may also look up whether an egress network device is SR aware on the list indicative of egress network devices that are SR aware.

The MVPN module of the ingress PE router may pass information on the list indicative of end points (MVPN egress PE routers that are SR aware) and TE constraints to an SR-TE module that uses an IGP (e.g., OSPF or ISIS). The MVPN module may also convey an indication of whether the SR-TE tunnel path is to be computed locally (on the ingress PE, using, for example, a shortest path first segment routing algorithm) or computed via a network controller.

The MVPN enhanced IR procedures according to the techniques of this disclosure may enable the ingress MVPN PE router to make use of non-SR tunnels (e.g., RSVP-TE tunnels using the list indicative of SR unaware MVPN PEs) and SR tunnels (e.g., using the list indicative of SR aware MVPN PEs) to deliver multicast traffic over I-PMSI.

In the example of a selective tunnel—S-PMSI, the ingress PE router, e.g., ingress PE router 20A from FIG. 1, may process received Type-4 MVPN routes and the corresponding Type-1 MVPN routes and create a list indicative of MVPN PE routers that are SR aware and another list indicative of MVPN PE routers that are not SR aware. In some examples, the lists may be stored together as a table.

The MVPN module of the ingress PE router may make use of existing IR procedures to create non-SR tunnels (e.g., RSVP-TE tunnels) to all egress PE routers that are SR unaware. The MVPN module may pass information on the list indicative of end points (MVPN egress PE routers that are SR aware) and TE constraints to the SR-TE module. The MVPN module may also convey an indication on whether the SR-TE tunnel path is to be computed locally (on the ingress PE router) or computed via a network controller.

MVPN enhanced IR procedures within the MVPN module may enable the ingress MVPN PE router to make use of non-SR tunnels (e.g., RSVP-TE tunnels using the list indicative of SR unaware MVPN PEs) and SR tunnels (using the list indicative of SR aware MVPN PEs) to deliver multicast traffic over S-PMSI.

Switching between non-SR tunnels and SR tunnels is now discussed. If an MVPN egress PE router, e.g., egress PE router 20B, refreshes a Type-1 MVPN route indicating a transition from SR unaware (Segment-Routing: 0:0) to SR aware (Segment-Routing: 1:0) through the attached extended community attribute Segment-Routing, the MVPN enhanced IR procedures on the ingress PE, e.g., ingress PE router 20A, may create an SR tunnel path to this MVPN egress PE router, and switch multicast traffic to the new SR tunnel to this MVPN egress PE router. The ingress PE router may then tear down or flush the non-SR tunnel previously created to this MVPN egress PE router.

The techniques of this disclosure are applicable for MVPN deployments having a mix of MVPN egress PE routers, some equipped with SR capabilities and some without SR capabilities. These techniques may inter-operate with legacy MVPN PE routers and SR capable PE routers. An SR-TE tunnel created between the ingress MVPN PE router and an egress MVPN PE router could be bridged/tunneled over non-SR (e.g., RSVP-TE) islands. Enhanced IR procedures allow the ingress MVPN PE router to create different TE paths (non-SR and SR) to different end points (e.g., MVPN egress PE routers) and to deliver multicast traffic on these newly created TE tunnels. The techniques of this disclosure may include a new community stored in the MVPN route table in, e.g., the MVPN module on the ingress PE router.

Figure 4:
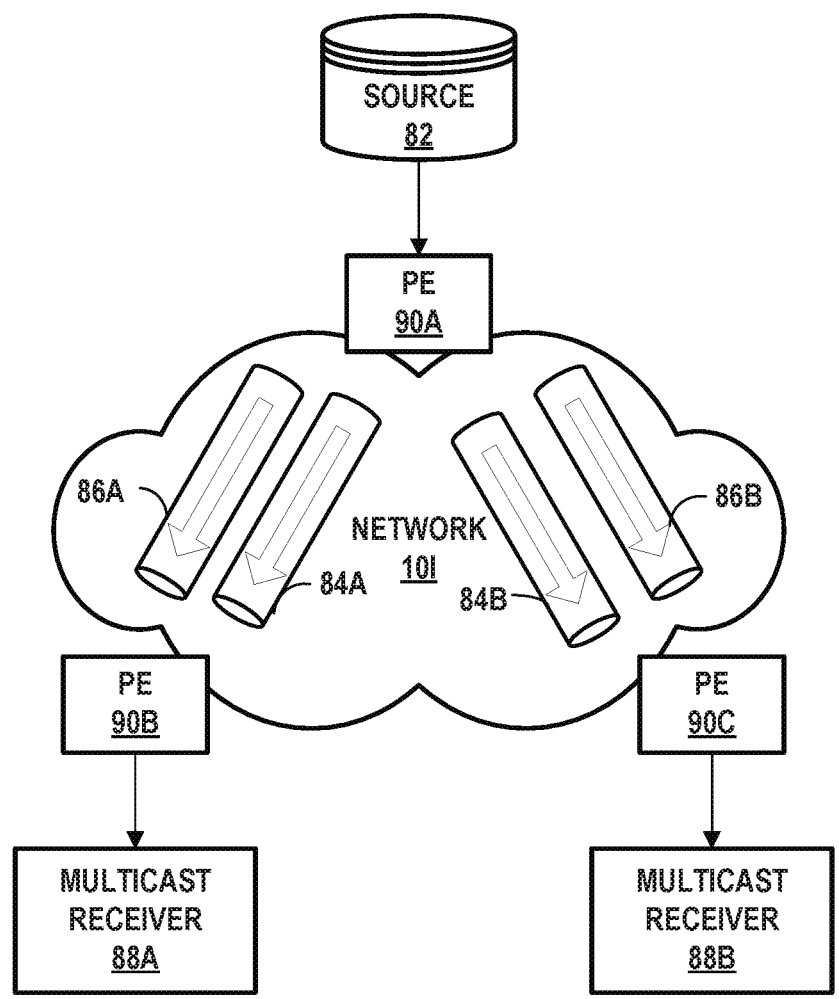
FIG. 4 is a block diagram of another example computer network including network devices within a single autonomous system configured to transmit multicast traffic between one or more multicast sources and multicast receivers according to the techniques of this disclosure.

FIG. 4 is another example computer network including network devices within a single autonomous system configured to transmit multicast traffic between one or more multicast sources and multicast receivers according to the techniques of this disclosure. In this example, network 101 includes ingress PE router 90A, egress PE router 90B and egress PE router 90C. Ingress PE router 90A is connected to multicast data source 82. Egress PE router 90B and egress PE router 90C are connected to multicast receiver 88A and multicast receiver 88B, respectively. Multicast data source 82 is connected to ingress PE router 90A. Multicast receiver 88A is connected to egress PE router 90B and multicast receiver 88B is connected to egress PE router 90C. Multicast data source 82, multicast receiver 88A and multicast receiver 88B may operate similarly to multicast data source 12, multicast receiver 18A and multicast receiver 18B as described above with respect to FIG. 1.

In this example, rather than (or in addition to) using an extended community attribute as in the examples of FIGS. 1-3, ingress PE router 90A may determine which types (e.g., SR or non-SR) of unicast tunnels exist and then initiate the establishment of a multicast tunnel of the same type as the existing unicast tunnel to a given PE router. For example, unicast tunnels 84A and 84B may exist. Unicast tunnel 84A may be a non-SR tunnel and unicast tunnel 84B may be an SR tunnel. In some examples, ingress PE router 90A may query routing information 62, through, e.g., a routing protocol daemon-Infra (RPD-Infra), to retrieve a list of tunnels from, e.g., an inet.3 table, to egress PE router 90B and egress PE router 90C. The MVPN module of ingress PE router 90A also may register for a flash/callback on any change in the tunnels with respect to egress PE router 90B and egress PE router 90C. In this way, ingress PE router may create a list indicative of egress PE routers that are SR aware and/or another list indicative of egress PE routers that are SR unaware. The MVPN module of ingress PE router 90A may make use of existing IR procedures to initiate the establishment of non-SR tunnel 86A (e.g., an RSVP-TE tunnel) to egress PE router 90B. The MVPN module on ingress PE router 90A may pass information on the list indicative of PE routers that are SR aware and TE constraints to a SR-TE module. The MVPN module on ingress PE router 90A may also convey an indication on whether SR-TE tunnel path needs to be computed locally (on the ingress PE, using, e.g., Distributed Constrained Shortest Path First (DCSPF) SR_TE) or computed via a network controller (not shown). The MVPN module on ingress PE router 90A may initiate the establishment of SR tunnel 86B. The techniques of the example of FIG. 4 may also be applicable to the network architectures of FIGS. 1 and 3.

Figure 5:
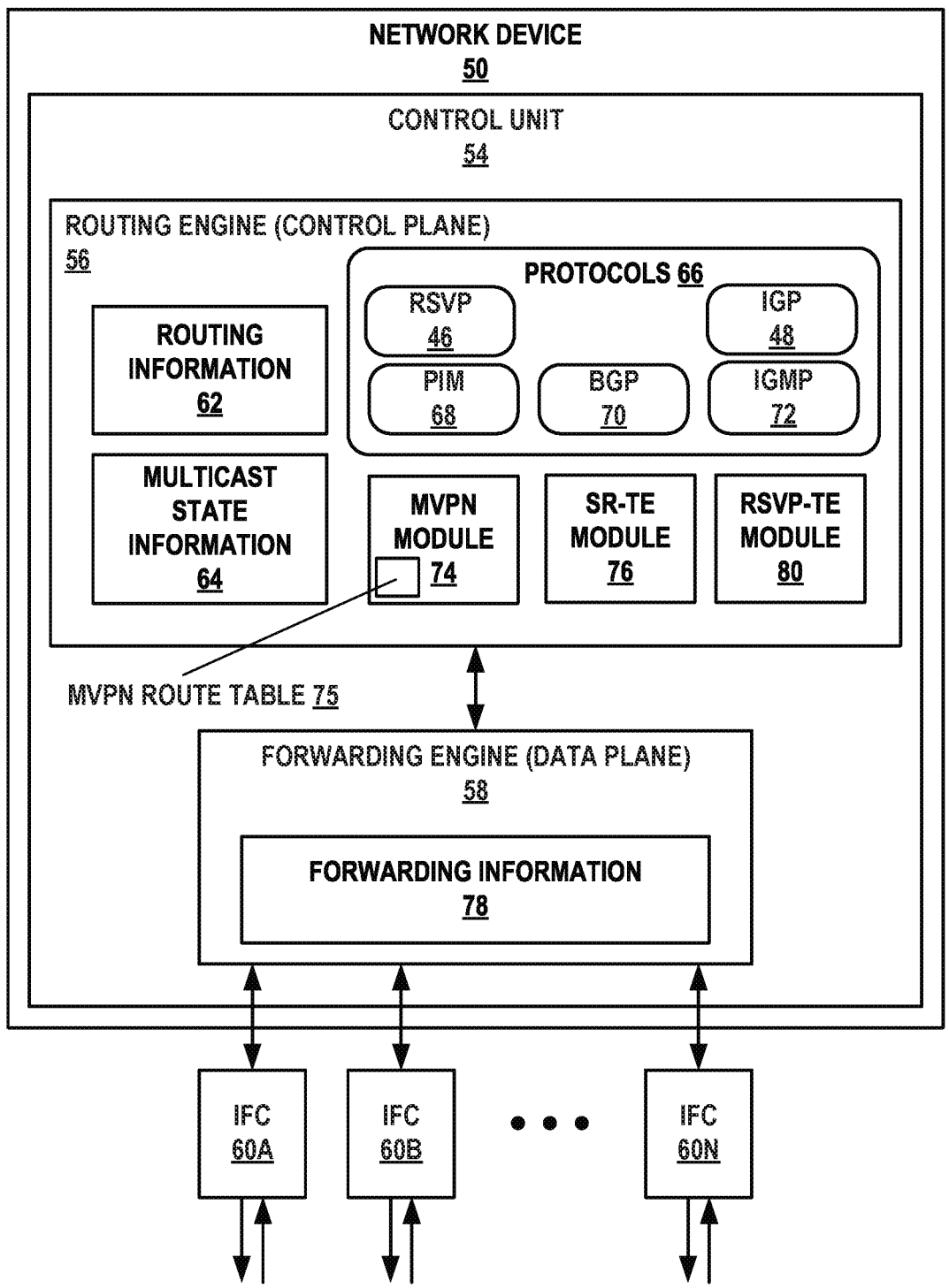
FIG. 5 is a block diagram illustrating an example network device configured to operate in accordance with techniques of this disclosure.

FIG. 5 is a block diagram illustrating an example network device 50 configured to operate in accordance with techniques of this disclosure. In one example, network device 50 may operate as an ingress network device to a network, such as an MPLS network. In another example, network device may operate as an egress network device. According to the disclosed techniques, in the example where network device 50 is an ingress network device, network device 50 is configured to determine whether an egress network device is SR aware, based on the egress network device being segment routing aware, initiate establishment of an SR-TE tunnel to the egress network device, and forward multicast traffic on the SR-TE tunnel. Network device 50 may operate substantially similar to ingress PE router 20A, ingress PE router 30A, ingress PE router 40A, or ingress PE router 90A of FIGS. 1-4.

In the illustrated example of FIG. 5, network device 50 includes interface cards 60A-60N ("IFCs 60") that receive control and data packets via incoming links and send control and data packets via outbound links. IFCs 60 are typically coupled to the incoming links and the outbound links via a number of interface ports. Network device 50 also includes a control unit 54 that determines routes of received packets and forwards the packets accordingly via IFCs 60.

Control unit 54 includes a routing engine 56 and a forwarding engine 58. Routing engine 56 operates as the control plane for router 50 and includes an operating system (not shown) that may provide a multi-tasking operating environment for execution of a number of concurrent processes. For example, routing engine 56 provides an operating environment for various protocols 66 that perform routing functions for network device 50. In the illustrated example of FIG. 5, routing engine 56 includes a BGP 70 as a unicast routing protocol used to exchange routing information, with other network devices in a network in order to discover the network topology and update routing information 62, and sending routes for MVPN auto-discovery, provider tunnel signaling, and customer multicast route signaling. BGP 70 may also be used to exchange extended community attributes, such as Segment-Routing between network equipment indicating whether a network device is SR aware. In addition, protocols 66 of routing engine 56 includes RSVP 46 used to exchange bandwidth reservation information and labels to build RSVP tunnels, IGP 48 used to exchange link state information along with labels and/or SIDs to build SR tunnels and PIM 68 as a multicast routing protocol used to build multicast distribution trees with the other network devices in the network using routing information 62 and multicast state information 64.

Protocols 66 of routing engine 56 also includes internet group management protocol (IGMP) 72 as a communications protocol used to establish multicast group memberships with IGMP hosts, e.g., receivers and sources, within customer sites external to the network. In some examples, routing engine 56 may receive IGMP report messages identifying a multicast group and, in some cases, a source of the multicast group in which an IGMP host is interested. Routing engine 56 may, in some examples, use PIM 68 to generate the multicast control messages (e.g., PIM join messages and/or PIM prune messages) used to build the multicast distribution trees in the network.

Routing information 62 may describe the topology of the network in which network device 50 resides, and may also describe various routes within the network and the appropriate next hops for each route, i.e., the neighboring network devices along each of the routes. Routing information 62 may include a list of incoming interfaces (IIFs) and a list of outgoing interfaces (OIFs) that indicate which of IFCs 60 are connected to the neighboring network devices in each route. For example, a given route may comprise a multicast route for multicast traffic of a given multicast group. In that example, the list of IIFs included in routing information 62 may include a list of upstream interfaces for all upstream neighbor network devices that have state for the given multicast group, and the list of OIFs included in routing information 62 may include a list of downstream interfaces for all downstream neighbor network devices that have state for the given multicast group. Multicast state information 64 may describe a current status of interfaces for the neighboring network devices in the multicast distribution trees established using PIM 68. For example, multicast state information 64 may include multicast state (e.g., PIM join state and PIM prune state) for each different multicast group within a range for a given multicast distribution tree. More specifically, for each multicast group, multicast state information 64 may include upstream and downstream interfaces toward neighboring network devices that belong to the respective multicast group.

MVPN module 74 may be configured to establish and maintain MVPN distribution trees or tunnels within the network using one or both of PIM 68 and BGP 70. For example, MVPN module 74 may signal SR-TE module 76 to initiate establishment of SR-TE tunnels. MVPN module 74 may also signal a non-SR-TE module, such as RSVP-TE module 80, to initiate establishment of non-SR tunnels. MVPN module 74 may contain MVPN route table 75 which may include a list that is indicative of which egress network devices are SR aware and/or a list indicative of which egress network devices are not SR aware.

Forwarding engine 58 may receive BGP messages and may forward received messages to MVPN module 74 for processing. In addition, MVPN module 74 may map MVPN membership information of other network devices within the network and generate multicast state for a given MVPN based on the MVPN membership information. In some examples, MVPN module 74 may store multicast state for one or more MVPNs in multicast state information 64.

Routing engine 56 analyzes routing information 62 and multicast state information 64 to generate forwarding information 78 installed in forwarding engine 58. Forwarding engine 58 provides data plane functionality for network device 50. Although not shown in FIG. 5, forwarding engine 58 may comprise a central processing unit (CPU), memory and one or more programmable packet-forwarding application-specific integrated circuits (ASICs). Forwarding information 78 associates network destinations with specific next hops and corresponding ports of IFCs 60.

According to the techniques of this disclosure, when network device 50 receives a Type-1 route (or a Type-4 route), such as Type-1 routes 14B, 14C, 24B, 24C, 34B and 34C, from an egress network device, network device 50 determines the extended community attribute Segment-Routing attached to the Type-1 route. In some examples, in the case where the extended community attribute Segment-Routing indicates that the egress network device is SR aware, network device 50 may add that network device to a list indicative of SR aware network devices which may be stored in MVPN route table 75 maintained by MVPN module 74 or elsewhere in network device 50. In some examples, in the case where the extended community attribute Segment-Routing indicates that the egress network device is not SR aware, network device 50 may add that network device to a list indicative of SR unaware network devices which may be stored in MVPN route table 75 maintained by MVPN module 74 or elsewhere in network device 50.

When a new tunnel is desired for multicast traffic, MVPN module 74 may look up whether the egress network device is on the SR aware list in MVPN route table 75, the SR unaware list in MVPN route table 75, or may look at a Type-1 route from the egress network device to determine the extended community attribute Segment-Routing, to determine which type of tunnel to create. MVPN module 74 may then utilize SR-TE module 76 to initiate establishment of a new SR-TE tunnel to the egress network device or may utilize a non-SR-TE module, such as RSVP-TE module 80, to initiate establishment of a new non-SR tunnel to the egress network device. In this manner, network device 50 may determine whether an egress network device is SR aware. Based on the egress network device being segment routing aware, initiate establishment of a SR-TE tunnel to the egress network device. Network device 50 may forward multicast traffic on the SR-TE tunnel.

In other examples, network device 50 may determine whether an egress network device is SR aware by looking up the egress network device in a static policy or list of MVPN egress network devices that is created by a network operator indicative of which egress network devices are SR aware. In other examples, network device 50 may determine whether an egress network device is SR aware based on types of existing unicast tunnels, such as discussed with respect to FIG. 4.

The architecture of network device 50 illustrated in FIG. 5 is shown for exemplary purposes only and should not be limited to this architecture. In other examples, network device 50 may be configured in a variety of ways. In one example, some of the functionally of control unit 54 may be distributed within IFCs 60. Control unit 54 may be implemented solely in software, or hardware, or may be implemented as a combination of software, hardware, or firmware. For example, control unit 54 may include one or more processors which execute software instructions. In that case, the various software modules of control unit 54 may comprise executable instructions stored on a computer-readable medium, such as computer memory or hard disk.

Figure 6:
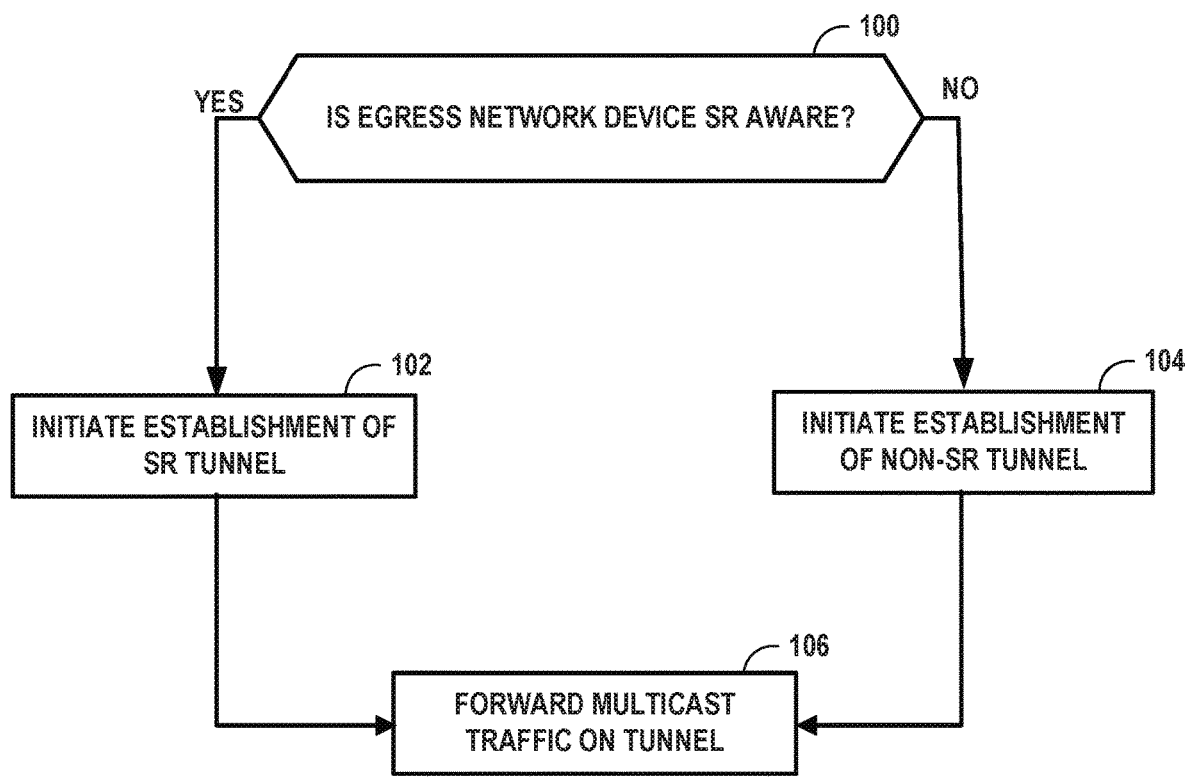
FIG. 6 is a flowchart illustrating an example operation of a network device according to the techniques of this disclosure.

FIG. 6 is a flowchart illustrating an example operation of a network device according to the techniques of this disclosure. Network device 50 (e.g., ingress PE router 20A) may determining whether a first egress network device (e.g., egress PE router 20C) is SR aware (100). For example, network device 50 may determine whether the first egress network device is SR aware by looking up the first egress network device in MVPN route table 75. In some examples, network device 50 may determine whether the first egress device is SR aware by looking up the first egress network device in a static policy or list of MVPN egress network devices created by a network administrator that lists those egress network devices that are SR aware and/or those egress network devices that are SR unaware. In other examples, MVPN route table 75 may be built by network device 50 based on an extended community attribute attached to Type-1 and Type-4 routes. In some examples, network device 50 may determine whether the first egress network device is SR aware by determining the extended community attribute attached to Type-1 or Type-4 routes without looking up the first egress network device in MVPN route table. In still other examples, network device 50 may determine whether the first egress network device is SR aware based on whether there is an existing unicast SR tunnel to the first egress network device.

Based on the first egress network device being segment routing aware (the "YES" path of 100), network device 50 may initiate establishment of an SR tunnel toward the first egress network device (102). For example, MVPN module 74 may signal SR-TE module 76 to initiate the establishment of a new SR tunnel toward the first egress network device. Network device 50 may forward multicast traffic on the SR tunnel towards the first egress network device (106).

Network device 50 (e.g., ingress network device 20A) may also determine whether a second egress network device (e.g., egress PE router 20B) is SR aware (100) in a similar manner to determining whether the first egress network device is SR aware. Based on the second egress network device not being SR aware (the "NO" path of 100), network device 50 may initiate establishment of a non-SR tunnel toward the second egress network device (104). For example, MVPN module 74 may signal RSVP-TE module 80 to initiate the establishment of a new non-SR tunnel toward the second egress network device. Network device 50 may forward multicast traffic on the non-SR tunnel towards the second egress network device (106).

In some examples, network device 50 may receive a Type-1 route, such as Type-1 routes 14B, 14C, 24B, 24C, 34B and 34C, from an egress network device (e.g., an egress PE router) and determine the extended community attribute Segment-Routing attached to the Type-1 route. In some examples, network device 50 may determine whether the egress PE router is SR aware by looking up the egress PE router on a list, e.g., in MVPN routing table 75. For example, network device 50 may determine the extended community attribute Segment-Routing attached to a Type-1 route and place the egress PE router on a list (e.g., MVPN routing table 75) indicative of the egress PE router's extended community attribute Segment-Routing. When setting up a new multicast tunnel to the egress PE router, network device 50 may look up the egress PE router on the list to determine whether the egress PE router is SR aware.

In other examples, network device 50 may determine which types (e.g., SR or non-SR) of unicast tunnels exist and then initiate the establishment of a multicast tunnel of the same type as the existing unicast tunnel to a given PE router, such as was discussed with respect to FIG. 4. In other examples, network device 50 may determine which egress network devices are SR aware by looking the egress network devices in a static policy or list of MVPN egress network devices that is created by a network operator indicative of which egress network devices are SR aware.

Figure 7:
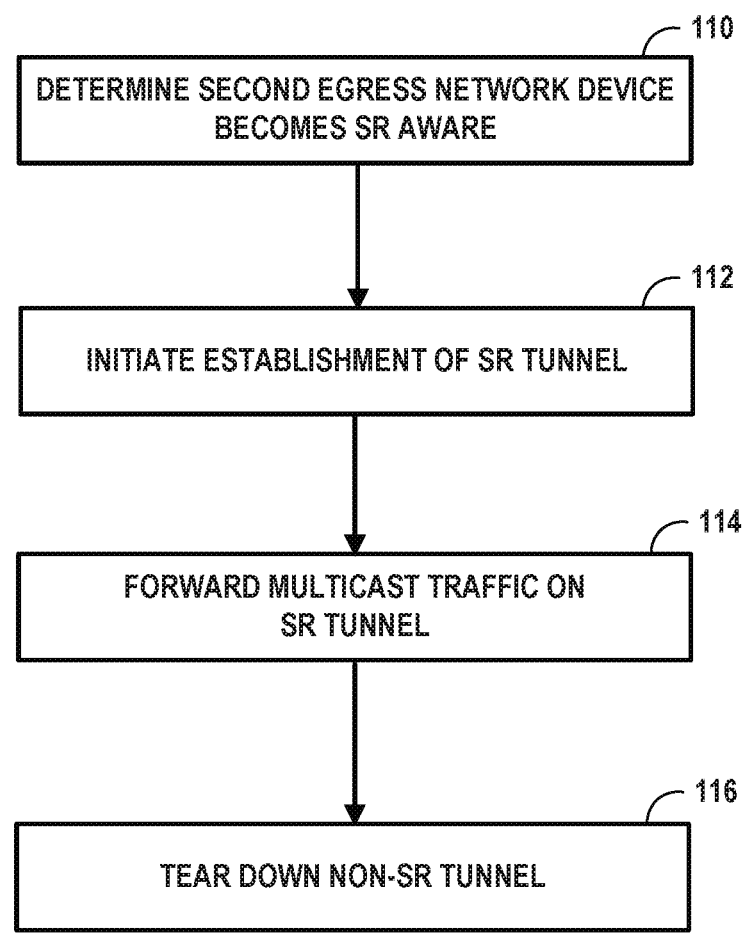
FIG. 7 is a flowchart illustrating another example operation of a network device according to the techniques of this disclosure.

FIG. 7 is a flowchart illustrating another example operation of a network device according to the techniques of this disclosure. In the example of FIG. 7, network device 50 has a multicast non-SR tunnel to the second egress network device as the second egress network device was previously SR unaware. Network device 50 may determine the second egress network device has become SR aware (110). For example, network device 50 may receive a Type-1 route from egress PE router 20B with extended community attribute Segment-Routing: 1:0 indicating that the second network device (e.g., egress PE router 20B) is now SR aware. Network device 50 may then initiate the establishment of an SR-TE tunnel to the second egress network device (112). For example, network device 50 may signal SR-TE module 76 to initiate the establishment of the SR-TE tunnel. Network device 50 may forward multicast traffic to the second egress network device on the new SR-TE tunnel (114). Network device 50 may then tear down or flush an old multicast non-SR tunnel (e.g., RSVP-TE tunnel 16A) to the second egress network device (116).

The techniques described herein may be easily implementable, as new functionality has to be added only on the ingress PE routers with the exception of a new extended community attribute which may exist on egress PE routers. No other control plane changes are necessary. The solution may be simple to operate and manage. This solution does not require any extra support in hardware in egress PE router. The techniques of this disclosure may be more efficient than alternative implementations during network migration from non-SR enabled to SR enabled network devices.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described in this disclosure. These and other examples are within the scope of the following claims.

What is claimed is:

1. A method comprising:
    determining, by an ingress network device, whether a first egress network device is segment routing (SR) aware;
    based on the first egress network device being SR aware, initiating, by the ingress network device, establishment of a first SR tunnel toward the first egress network device;
    forwarding, by the ingress network device, multicast traffic on the first SR tunnel; determining, by the ingress network device, whether a second egress network device is SR aware;
    based on the second egress network device not being segment routing aware, initiating, by the ingress network device, establishment of a non-SR tunnel toward the second egress network device;
    forwarding, by the ingress network device, multicast traffic on the non-SR tunnel;
    determining, by the ingress network device, that the second egress network device becomes SR aware;
    initiating, by the ingress network device, the establishment of a second SR tunnel to the second egress network device;
    forwarding, by the ingress network device, multicast traffic on the second SR tunnel; and
    tearing down, by the ingress network device, the non-SR tunnel.

2. The method of claim 1, wherein the non-SR tunnel is a Resource Reservation Protocol (RSVP) tunnel.

3. The method of claim 1, wherein determining whether the first egress network device is SR aware comprises receiving, in a message advertised by the first egress network device, a Border Gateway Protocol (BGP) extended community attribute indicative of whether the first egress network device is SR aware.

4. The method of claim 3, wherein determining whether the first egress network device is SR aware further comprises receiving one of a Type-1 multicast virtual private network (MVPN) route including the BGP extended community attribute or a Type-4 MVPN route including the BGP extended community attribute.

5. The method of claim 3, determining whether the first egress network device is SR aware further comprises creating a list indicative of egress network devices that are SR aware based on the BGP extended community attribute.

6. The method of claim 5, determining whether the first egress network device is SR aware further comprises looking up whether the first egress network device is SR aware on the list indicative of egress network devices that are SR aware.

7. The method of claim 1, sending, by the ingress network device and to egress network devices within a given multicast virtual private network (MVPN), a message including a Border Gateway Protocol (BGP) extended community attribute indicating that the ingress network device is SR aware, wherein an MVPN knob triggers attachment of the BGP extended community attribute to a Type-1 MVPN route or a Type-4 MVPN route.

8. The method of claim 1, wherein the ingress network device, the first egress network device, and the second egress network device comprise an MVPN.

9. The ingress network device of claim 1, wherein the ingress network device, the first egress network device, and the second egress network device comprise an MVPN.

10. An ingress network device comprising:
    at least one computer processor; and
    a memory comprising instructions that when executed by the at least one computer processor cause the at least one computer processor to:
        determine whether a first egress network device is SR aware;
        based on the first egress network device being SR aware, initiate establishment of a first SR tunnel towards the first egress network device;
        forward multicast traffic on the first SR tunnel;
        determine whether a second egress network device is SR aware;
        based on the second egress network device not being segment routing aware, initiate establishment of a non-SR tunnel towards the second egress network device;
        forward multicast traffic on the non-SR tunnel;
        determine that the second egress network device becomes SR aware;
        initiate the establishment of a second SR tunnel to the second egress network device;
        forward multicast traffic on the second SR tunnel; and
        tear down the non-SR tunnel.

11. The ingress network device of claim 10, wherein the non-SR tunnel is a Resource Reservation Protocol (RSVP) tunnel.

12. The ingress network device of claim 10, wherein the instructions cause the at least one computer processor to determine whether the first egress network device is SR aware by at least receiving, in a message advertised by the first egress network device, a BGP extended community attribute indicative of whether the first egress network device is SR aware.

13. The ingress network device of claim 12, wherein the instructions further cause the at least one computer processor to receive one of a Type-1 MVPN route including the BGP extended community attribute or a Type-4 route including the BGP extended community attribute.

14. The ingress network device of claim 12, wherein the instructions cause the at least one computer processor to create a list indicative of egress network devices that are SR aware based on the BGP extended community attribute.

15. The ingress network device of claim 14, wherein the instructions cause the at least one computer processor to look up whether the egress network device is SR aware on the list indicative of egress network devices that are SR aware.

16. The ingress network device of claim 10, wherein the instructions further cause the at least one computer processor to send to egress network devices within a given MVPN, a message including a BGP extended community attribute indicating that the ingress network device is SR aware, wherein an MVPN knob triggers attachment of the BGP extended community attribute to a Type-1 MVPN route or a Type-4 MVPN route.

17. A non-transitory computer-readable storage medium encoded with instructions that, when executed, cause at least one processor of a computing device to:
- determine whether a first egress network device is SR aware;
- based on the first egress network device being segment routing aware, initiate establishment of a first SR tunnel toward the first egress network device;
- forward multicast traffic on the first SR tunnel;
- determine whether a second egress network device is SR aware;
- based on the second egress network device not being SR aware, initiate establishment of a non-SR tunnel toward the second egress network device; and
- forward multicast traffic on the non-SR tunnel;
- determine that the second egress network device becomes SR aware;
- initiate the establishment of a second SR tunnel to the second egress network device;
- forward multicast traffic on the second SR tunnel; and
- tear down the non-SR tunnel.

18. The non-transitory computer-readable storage medium of claim 17, wherein the non-SR tunnel is a Resource Reservation Protocol (RSVP) tunnel.

* * * * *